United States Patent
Kawagoe et al.

(10) Patent No.: US 11,443,456 B2
(45) Date of Patent: Sep. 13, 2022

(54) DATA COMPRESSION METHOD AND DEVICE

(71) Applicant: DENSO CORPORATION, Kariya (JP)

(72) Inventors: Tadashi Kawagoe, Kariya (JP); Kazuyoshi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 253 days.

(21) Appl. No.: 16/816,468

(22) Filed: Mar. 12, 2020

(65) Prior Publication Data
US 2020/0302649 A1  Sep. 24, 2020

(30) Foreign Application Priority Data

Mar. 18, 2019 (JP) .............................. JP2019-050301

(51) Int. Cl.
*G06T 9/00* (2006.01)
*H04L 1/00* (2006.01)
*G16Y 40/35* (2020.01)

(52) U.S. Cl.
CPC .............. *G06T 9/00* (2013.01); *H04L 1/0076* (2013.01); *G16Y 40/35* (2020.01); *H04L 2001/0097* (2013.01)

(58) Field of Classification Search
CPC . G06T 9/00; H04L 1/0076; H04L 2001/0097; G16Y 40/35
USPC ....................................................... 382/244
See application file for complete search history.

(56) References Cited

U.S. PATENT DOCUMENTS

| | | | | |
|---|---|---|---|---|
| 9,830,369 | B1* | 11/2017 | Ben-Natan | G06F 16/22 |
| 2005/0152605 | A1* | 7/2005 | Hoogendijk | G06T 9/005 |
| | | | | 382/232 |
| 2007/0113140 | A1* | 5/2007 | Roh | H04L 1/1671 |
| | | | | 714/776 |
| 2007/0208440 | A1* | 9/2007 | Bliss | G05B 19/056 |
| | | | | 700/87 |
| 2008/0133175 | A1* | 6/2008 | LoBuono | G06F 11/008 |
| | | | | 714/E11.154 |
| 2008/0155045 | A1 | 6/2008 | Koyama | |
| 2012/0205436 | A1* | 8/2012 | Thomas | G06K 17/0025 |
| | | | | 235/375 |
| 2013/0009785 | A1* | 1/2013 | Finn | B61D 19/026 |
| | | | | 340/545.1 |
| 2016/0003632 | A1* | 1/2016 | Masuda | G08G 1/096775 |
| | | | | 701/522 |
| 2018/0336177 | A1 | 11/2018 | Kataoka et al. | |

FOREIGN PATENT DOCUMENTS

| | | |
|---|---|---|
| JP | H05-344358 A | 12/1993 |
| JP | H10-341163 A | 12/1998 |
| JP | H11-068580 A | 3/1999 |
| JP | 2008-147489 A | 6/2008 |

(Continued)

*Primary Examiner* — Wednel Cadeau
(74) *Attorney, Agent, or Firm* — Harness, Dickey & Pierce, P.L.C.

(57) ABSTRACT

In a data compression method of compressing data including at least one of a character and a number, the data is converted into character string data composed of 0s and 1s. Each of the 0s and 1s included in the character string data is treated as 1-bit data, and the 1-bit data is arranged in a data region having a two-dimensional array. Lossless compression of the data arranged in the data region is performed by using an image processing method.

18 Claims, 10 Drawing Sheets

(56) References Cited

FOREIGN PATENT DOCUMENTS

| | | |
|---|---|---|
| JP | 2012-034272 A | 2/2012 |
| JP | 2013-080443 A | 5/2013 |
| JP | 2018-195956 A | 12/2018 |

\* cited by examiner

ORIGINAL DATA

T0, OFF, ON, OFF, ON, 800

⇩ ASSIGN CHARACTER STRINGS

ASSIGNMENT DATA

T0, 0, 1, 0, 1, 800

⇩ CONVERT NUMERICAL DATA INTO BINARY NUMBER

BINARY-CODED DATA

T0, 0, 1, 0, 1, 0000001100100000

⇩ DELETE TIME DATA

TIME-DELETED DATA 0, 1, 0, 1, 0000001100100000

⇩ DELETE COMMAS

CHARACTER STRING CONVERSION DATA

ARRANGE INDIVIDUAL DATA

PSEUDO IMAGE DATA

FIG.9

LOSSLESS COMPRESSION DATA (FILE NAME: T0.png)

DATA COMPRESSION METHOD AND DEVICE

CROSS-REFERENCE TO RELATED APPLICATION

This application is based on and claims the benefit of priority from earlier Japanese Patent Application No. 2019-050301 filed Mar. 18, 2019, the description of which is incorporated herein by reference.

BACKGROUND

Technical Field

The present disclosure relates to a data compression method and a data compression device for compressing data.

Related Art

In recent years, the so-called Internet of Things has been introduced in the field of industry. Hereinafter, the Internet of Things is referred to as IoT. The IoT, for example, collects control data of a device. The collected data can be used, for example, for recovery of the device from breakdown, and are thus required to be stored for a long period of time.

DESCRIPTION OF SPECIFIC EMBODIMENTS

For example, JP-A-1993-344358 proposes to compress collected data to store the data in a small storage capacity.

However, industrial devices are assumed to be required to collect control data, for example, for each control cycle of ten-odd milliseconds. Furthermore, the industrial devices are assumed to operate for a long time on a daily basis. As a result, an enormous amount of data needs to be saved. Accordingly, a more efficient compression method is desired for the IoT intended to be used for the industrial devices.

In the industrial devices, as described above, in some cases, data is collected for preservation purposes, and the compressed data is required to be restored to the original data in a lossless manner.

In view of the foregoing, it is desired to have a data compression method and a data compression device capable of compressing data in a lossless and efficient manner.

Hereinafter, an embodiment of the present disclosure is described with reference to the drawings. The embodiment described below presents an example of implementing the present disclosure, and the present disclosure is in no way limited to the specific configuration described below. When implementing the present disclosure, a specific configuration according to the embodiment may be employed as appropriate.

An embodiment will be described below with reference to the drawings.

Figure 1:
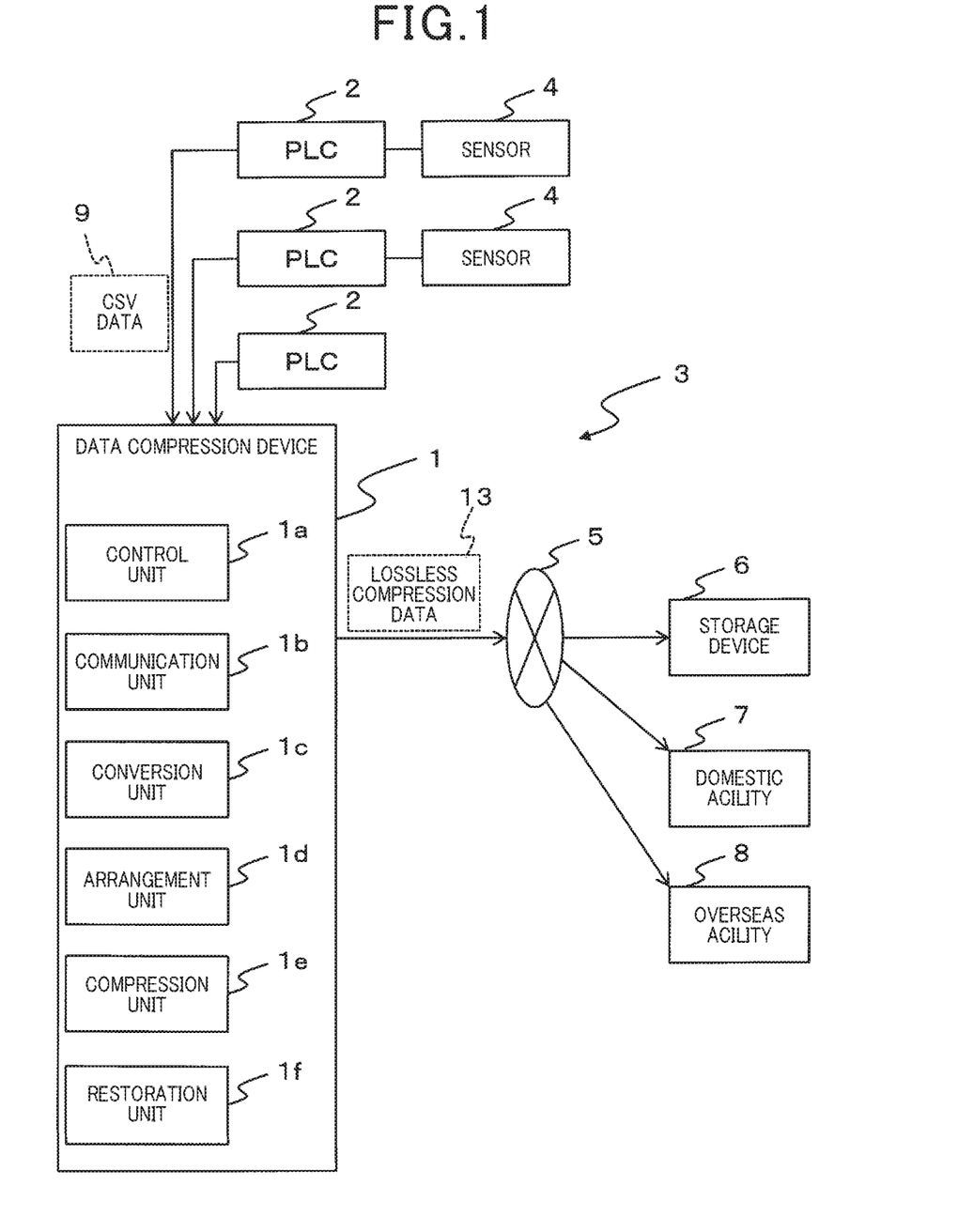
FIG. 1 schematically shows a configuration of an IoT system including a data compression device of an embodiment.

As shown in FIG. 1, a data compression device 1 of the present embodiment constitutes an Internet of Things system 3 (hereinafter referred to as IoT system 3) to which, for example, a programmable logic controller 2 (hereinafter referred to as PLC 2) which is an industrial device is connected. The data compression device 1 collects control data of the PLC 2. Although described later in detail, the PLC 2 outputs control data such as an open/closed state of a relay provided in the PLC 2, a detection value of a sensor 4, and the like in a comma separated values text file format (hereinafter referred to as CSV format). In some cases, no sensor 4 is connected to the PLC 2.

The data compression device 1 compresses data in the CSV format transmitted from the PLC 2 and saves the compressed data in an external storage device 6 via a communication network 5. That is, in the present embodiment, the data in the CSV format is to be compressed. Another domestic facility 7, an overseas facility 8, and the like are connected to the communication network 5, and the compressed data is transmitted from the storage device 6 to the facilities as necessary. The IoT system 3 may be configured such that no storage device 6 is provided and the compressed data is stored in the data compression device 1 or that the compressed data is stored both in the storage device 6 and the data compression device 1.

The data compression device 1 includes a control unit $1a$, a communication unit $1b$, a conversion unit $1c$, an arrangement unit $1d$, a compression unit $1e$, a restoration unit $1f$ and the like. The control unit $1a$ controls the entire data compression device 11 by executing a computer program stored in a storage medium (not shown).

The communication unit $1b$ communicates with the PLC 2 and also communicates with the external storage device 6, or the domestic facility 7 or the overseas facility 8 via the communication network 5. The communication network 5 is assumed to be the so-called Internet.

Although described later in detail, the conversion unit $1c$ converts the data in the CSV format received by the communication unit $1b$ into character string data composed of 0s and 1s. The arrangement unit $1d$ arranges the character string data converted by the conversion unit $1c$ in a data region having a two-dimensional array, for example, provided in a memory. The compression unit $1e$ performs lossless compression of the character string data arranged in the data region by using an image processing method. The restoration unit $1f$ restores the data compressed by lossless compression to the data in the original format, in this case, in the CSV format.

Next, effects of the above configuration will be described.

First, control data transmitted from the PLC 2 will be briefly described by taking as an example a state in which the sensor 4 is connected to the PLC 2. As shown in chronological order in FIG. 2, the PLC 2 includes, for example, four relays, i.e., relays A to D, and detects a position of a target by using the sensor 4.

Figure 2:
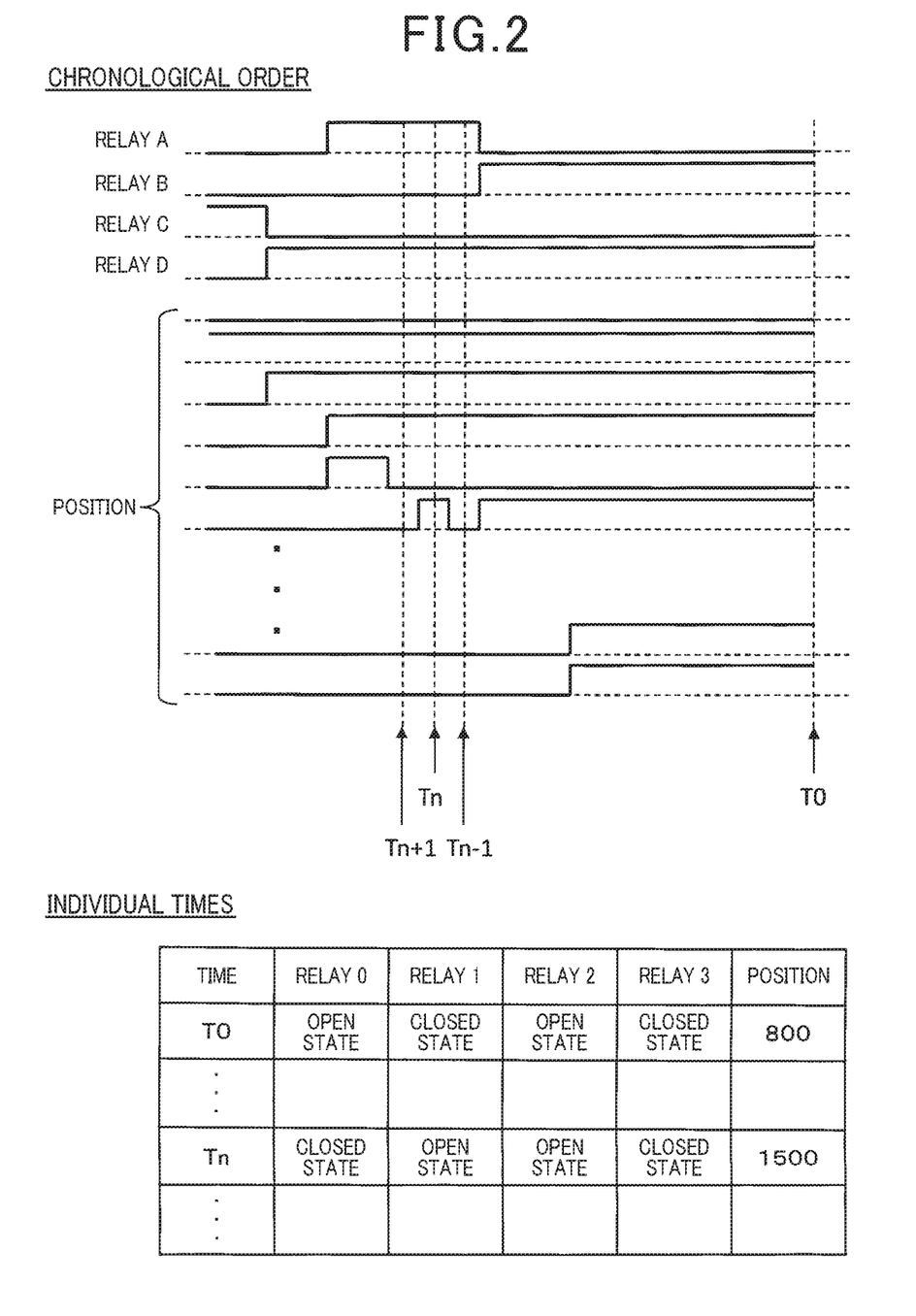
FIG. 2 shows, in chronological order and at individual times, an example of a mode in which data is outputted from a programmable logic controller (PLC)

In FIG. 2, the PLC 2 starts recording control data at time T0, and subsequently records control data for each control cycle. At this time, the PLC 2 records an open/closed state of the relays A to D and a detection value of the sensor 4 in chronological order. The control data shown in FIG. 2 is an example.

Thus, when the control data is analyzed, as shown at individual times in FIG. 2, it can be determined that, for example, at time T0, the relay A is in an open state, the relay B is in a closed state, the relay C is in an open state, and the relay D is in a closed state, and a position of the target at time T0 is 800.

Figure 3:
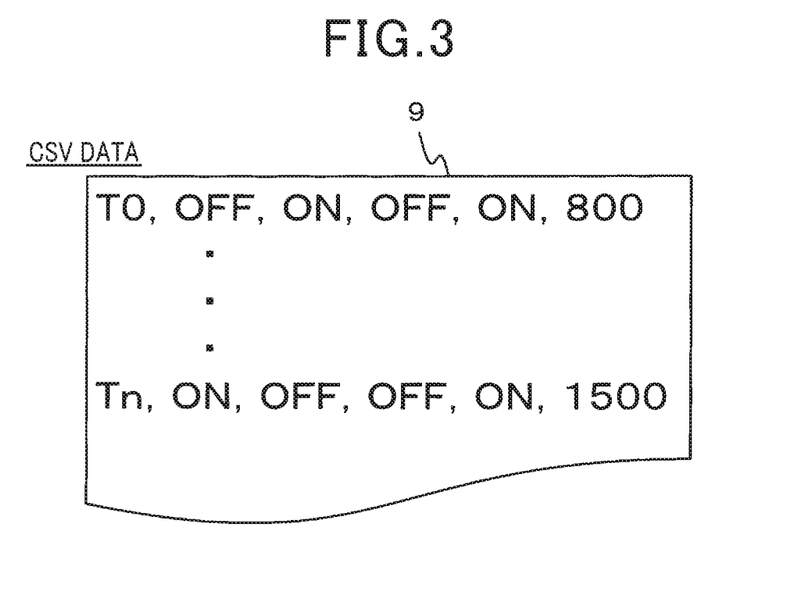
FIG. 3 schematically shows an example of Comma Separated Value (CSV) data transmitted from the PLC.

As shown in FIG. 3, the PLC 2 transmits control data in the CSV format to the data compression device 1, for example, for each operation cycle or for each predetermined period. Hereinafter, the data in the CSV format transmitted to the data compression device 1 is referred to as CSV data 9.

In the CSV data 9, an open/closed state of the relay is recorded as visually recognizable characters such that OFF is recorded when the relay is in an open state and ON is recorded when the relay is in a closed state. That is, the CSV data 9 includes at least one of characters and numbers, in this case, both the characters and the numbers. Furthermore, the CSV data 9 includes a time stamp, such as T0, that indicates a time at which the data is stored. The CSV data 9 shown in FIG. 3 is merely an example.

By receiving the CSV data 9, the data compression device 1 and other devices can utilize the CSV data 9, for example, to check the chronological data in FIG. 2 by using spreadsheet software, to compare the data with control data in the case of problems, to use the data as a reference for startup of another production line, or the like.

As described above, however, in the industrial device such as the PLC 2, in some cases, control data is updated, for example, for each control cycle of ten-odd milliseconds. Furthermore, the PLC 2 is assumed to operate for a long time on a daily basis. Thus, for example, assuming that the control data is updated every 10 milliseconds, the control data is updated 100 times in 1 second, and in this case, if 1000 types of data need to be collected, a hundred thousand data items need to be stored in 1 second. Accordingly, for example, when the PLC 2 is continuously operated for 24 hours, an enormous amount of data, i.e., 8.6 billion data items need to be stored per day.

In order to store such an enormous amount of data, for example, the storage device 6 having a large capacity needs to be prepared, and this requires an enormous amount of investment. Furthermore, when an enormous amount of data is stored, a large amount of time is required to store the data in the storage device 6 or transmit the data to another facility, and this leads to deterioration in responsiveness. Furthermore, in order to use the stored data for recovery from breakdown, startup of a production line, or the like, after the data is compressed, the compressed data needs to be restored to the original data in a lossless manner.

Thus, the data compression device 1 first eliminates several unnecessary items from the CSV data 9 transmitted from the PLC 2 to reduce the amount of data, and then compresses the reduced amount of data to reduce the final amount of data. The unnecessary items are items that can be deleted without affecting restoration of the original data.

By taking as an example the CSV data 9 shown in FIG. 3, the unnecessary items included in the CSV data 9 will be described below. The CSV data 9 includes, for example, a time stamp T0, a comma character ",", indicating separation of the data, characters "ON" or "OFF" indicating a state of the relay, numerical data such as a detection value of the sensor 4 indicated as "800", and the like.

First, a first unnecessary item is presumably a comma character. The comma character is inserted to separate the data, and thus approximately the same number of comma characters as the number of data items are included. Accordingly, by deleting the comma characters, the number of data items to be compressed can be reduced to approximately ½ by simple calculation.

As in the present embodiment, when the CSV data 9 transmitted from the PLC 2 is to be compressed, in the CSV data 9, the control data is stored in a predetermined format. More specifically, in the CSV data 9 transmitted from the PLC 2, the predetermined number of data items such as data indicating an open/closed state of the relay and numerical values are stored at predetermined positions in a predetermined order. Accordingly, even when the commas are deleted, the original order and the original separation of the data can be determined.

Next, a second unnecessary item is presumably a character code. The CSV data 9 includes the above-mentioned characters, numerical data, and the like as the character codes. For example, numerical data "800" is composed of a combination of numbers "8", "0", and "0". For example, as a character code, the number "8" is indicated as a hexadecimal number "38", and as a binary number usable by computers, the number "8" is 8-bit data "00111000". Thus, when "800" is recorded in the CSV data, the amount of data "800" is 24 bits. Accordingly, as described later, by converting a numerical value into a binary number and treating "0" and "1" as 1-bit data, the amount of data corresponding to a single character can be reduced to ⅛.

A third unnecessary item is presumably characters "ON" and "OFF" indicating a state of the relay. The relay can be in one of two states, i.e., an open state or a closed state. Thus, in short, an open/closed state of the relay can be indicated by a single character 0 or 1. That is, the characters "ON" and "OFF" themselves included in the CSV data 9 are presumably unnecessary. Accordingly, as described later, for example, by assigning "ON" to "1" and assigning "OFF" to "0", the amount of data can be reduced to ½ or ⅓.

The data compression device 1 eliminates these unnecessary items in the following manner. A process described below is performed by the conversion unit is and the like. In order to simplify the description, however, the process will be described assuming that the process is mainly performed by the data compression device 1.

Figure 4:
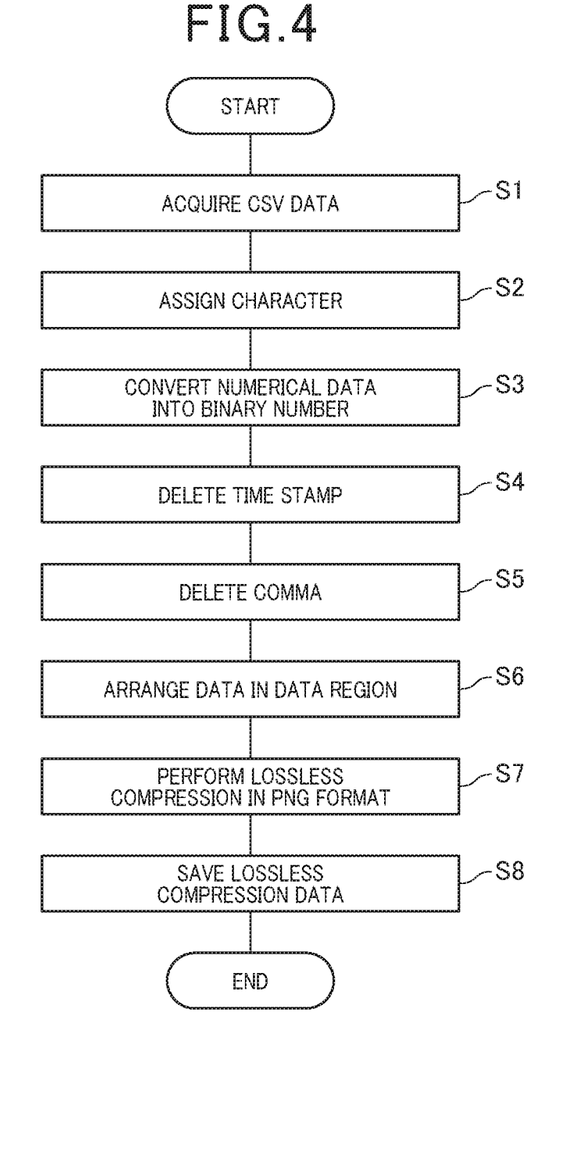
FIG. 4 shows a flow of a compression process of compressing the CSV data.

The data compression device 1 performs a compression process shown in FIG. 4. At step S1, the data compression device 1 acquires the CSV data 9. The data compression device 1 may be configured to automatically start the compression process upon receipt of the CSV data 9. Alternatively, the data compression device 1 may be configured to temporarily store the CSV data 9 and start the compression process when a user operation for the compression is inputted. Steps S2 to S5 described below are not in any particular order and may be performed in any order.

Figure 5:
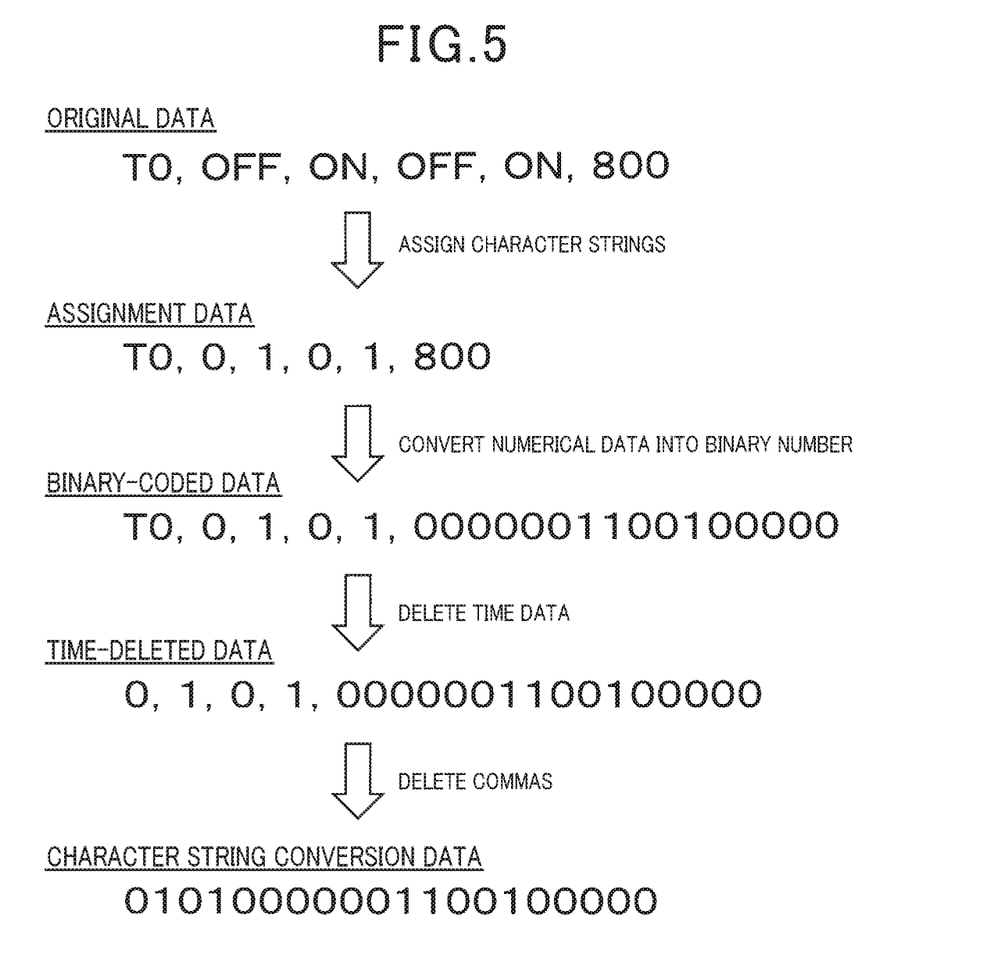
FIG. 5 schematically shows a mode in which the CSV data is converted into character string conversion data.

For example, as shown as original data in FIG. 5, the acquired CSV data 9 includes time T0, a comma character "," indicating separation of the data, characters "ON" and "OFF" indicating a state of the relay, and numerical data such as a detection value of the sensor 4 indicated as "800".

At step S2 of the compression process, the data compression device 1 assigns, to one of binary digits 0 and 1, the characters included in the CSV data 9, in this case, the characters "ON" or "OFF" indicating a state of the relay. In the present embodiment, the characters "OFF" indicating an open state is assigned to 0, and the characters "ON" indicating a closed state is assigned to 1. Thus, as shown as assignment data in FIG. 5, the characters "ON" and "OFF" are each represented by the corresponding bit 0 or 1. The original data can be restored from the assignment data.

Subsequently, at step S3 of the compression process, the data compression device 1 converts the numerical data into a binary number. For example, when the numerical data is "800", the data compression device 1 converts "800" into "0000001100100000", which is a character string representing a binary number having a fixed bit width, in this case, a 16-bit width. Thus, when shown as binary-coded data in FIG. 5, the numerical data is represented by the corresponding character string composed of 0s and 1s.

The numerical data only needs to be converted into a binary number having a fixed width that covers a possible range of the numerical data, and the binary number may have an 8-bit width or a 32-bit width. The original assignment data can be restored from the binary-coded data.

Subsequently, at step S4 of the compression process, the data compression device 1 deletes the time stamp. Thus, as shown as time-deleted data in FIG. 5, the control data can be represented by a character string composed of 0s and 1s.

When the time stamp is deleted, the time-deleted data alone is no longer associated with a time. As described above, however, in the CSV data 9, control data is stored, for example, for each control cycle. Thus, a time interval between control data and the control data subsequently stored coincides with the control cycle.

As described later, the time stamp stored first is used as a file name when the compressed data is saved. Even when the time stamp is deleted at step S4, therefore, after the compression, the time stamp can be restored to determine a chronological change. Thus, the original binary-coded data can be restored from the time-deleted data.

Subsequently, at step S5 of the compression process, the data compression device 1 deletes comma characters. Thus, when shown as character string conversion data in FIG. 5, the data includes only the characters 0s and 1s. In this case, as described above, the data transmitted from the PLC 2 is stored in a predetermined format, and thus even when the comma characters are deleted, it can be determined that the first 4 characters of the character string conversion data indicate an open/closed state of the relay, and the subsequent 16 characters indicate the position by a binary number. Thus, the original time-deleted data can be restored from the character string conversion data.

Figure 6:
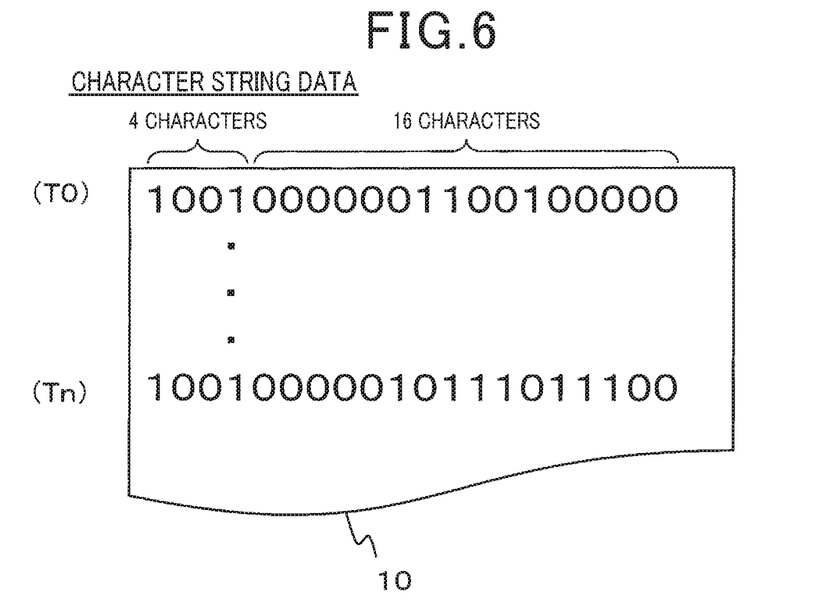
FIG. 6 schematically shows an example of character string data.

By converting the entire CSV data 9 into character string conversion data, the data compression device 1 generates character string data 10 shown in FIG. 6. The character string data 10 is data including only the characters "0" and "1". Thus, in short, by treating each character as a 1-bit binary number, for example, the first 8 characters of the character string data 10 can be treated as 8-bit data.

Figure 7:
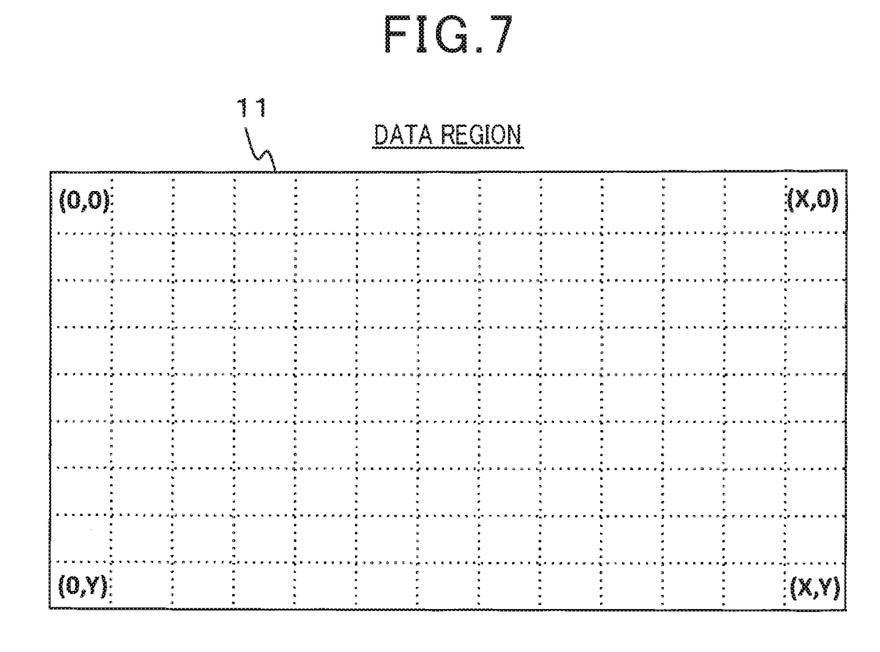
FIG. 7 schematically shows an example of a data region.

Subsequently, at step S6 of the compression process, the data compression device 1 arranges the character string data 10 in a two-dimensional array in a data region 11 prepared in the memory. As shown in FIG. 7, as with a typical bitmap image, the data region 11 is a two-dimensional dot matrix region having X×Y pixels, and a color value is set for each of the pixels. In the present embodiment, each pixel expresses color as 24-bit color values, i,e. so-called full color. The number of pixels may be appropriately set according to the amount of data to be compressed, and the color value may be appropriately set to 8-bit color or 16-bit color according to the amount of data to be compressed.

Figure 8:
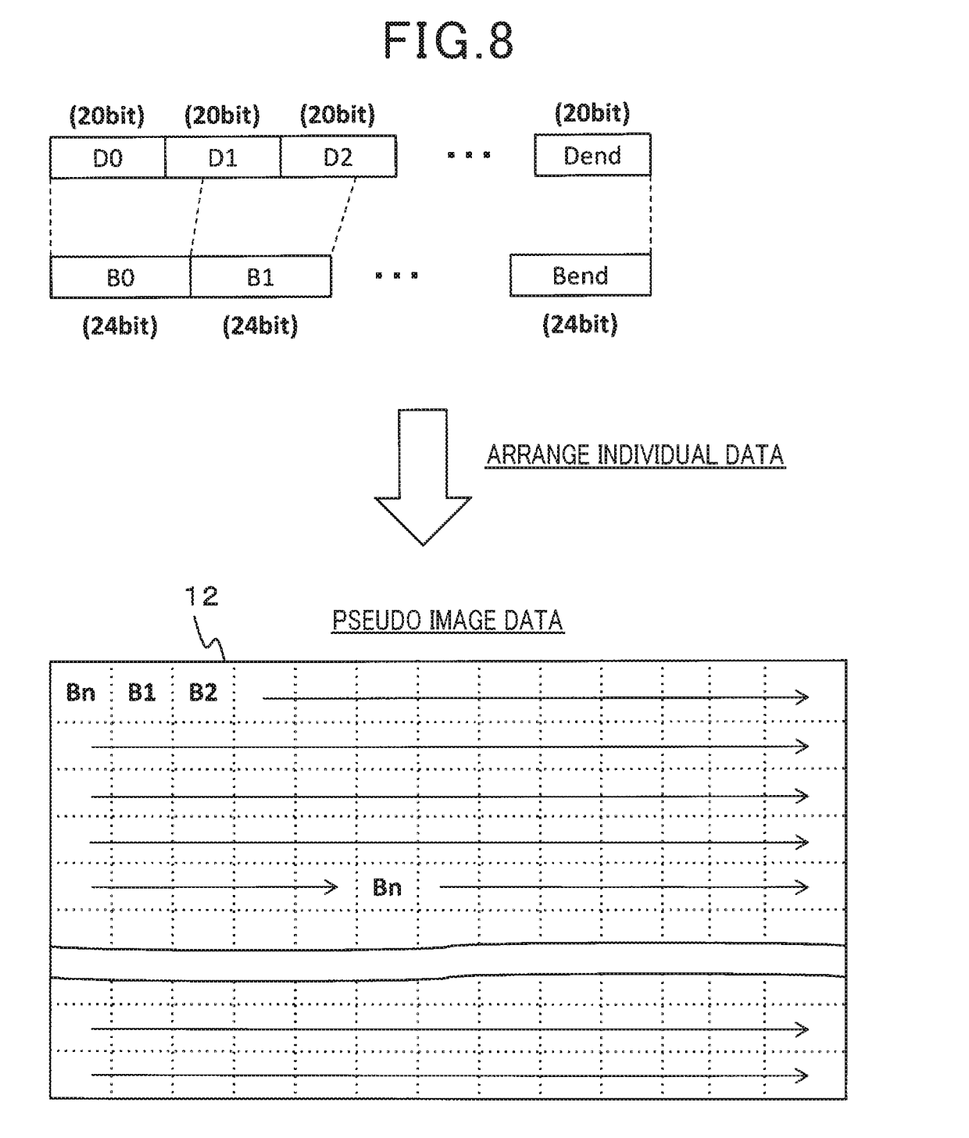
FIG. 8 schematically shows a mode in which pseudo image data is generated.

Specifically, as shown in FIG. 8, for example, the data compression device 1 arranges, in series, Dns, which is the character string data 10 at respective times, and the data compression device 1 divides Dns as a whole into Bns, each of which is individual data corresponding to the color value. Dend indicates the character string data 10 at the last time point, and Bend indicates the last individual data.

The present embodiment shows an example in which the character string data 10 includes 20 characters. Thus, the characters are assigned from a plurality of character string data 10 to a single piece of individual data. When the number of characters of the character string data 10 is larger than the color value, a plurality of individual data are assigned to a single piece of character string data 10. Furthermore, when the character string data 10 are insufficient for the color value, a dummy character string is inserted into the last individual data. Furthermore, even when the character string data 10 are divided to be assigned to the individual data, the order and number of data items are not changed, and thus the character string data 10 can be restored from the individual data.

While assigning the characters "0" and "1" of the individual data to 1-bit color of each pixel, the data compression device 1 arranges all the individual data in the data region 11. Hereinafter, the data region 11 in which the individual data are arranged is treated as pseudo bitmap image data and for convenience, referred to as pseudo image data 12.

Subsequently, at step S7 of the compression process, the data compression device 1 performs lossless compression of the pseudo image data 12 by an image processing method using a Portable Network Graphics (hereinafter referred to as PNG) format. As is well known, the PNG format compression method is referred to as a dictionary-based compression method, and is a method in which a predetermined pattern is read and the read pattern is converted into numbers. The PNG-format compression method is widely used in the field of computing and has a proven track record and informative codes. Hereinafter, the data compressed by lossless compression is referred to as lossless compression data 13.

The data compression device 1 saves, as a PNG file, the lossless compression data 13 compressed in the PNG format. At this time, the data compression device 1 saves the PNG file under a file name "T0" which is the time at which the first data has been recorded or under a file name by which T0 can be identified. Thus, it is possible to identify, from the lossless compression data 13 alone, the time at which the data has been recorded first, and by counting the control cycles, it is possible to restore the times at which the respective subsequent data have been recorded.

With regard to the lossless compression data 13 generated in this manner, as an example, it has been confirmed that, for example, in the case of the CSV data 9 having a file size of 600 KB, by deleting commas and assigning characters "ON" and "OFF" to "0" and "1" to reduce the number of characters, and treating each of the characters "0" and "1" as 1-bit data and compressing the 1-bit data in the PNG format, the CSV data 9 is compressed to have a reduced file size of approximately 3.6 KB. It has been also confirmed that when various types of CSV data 9 are compressed in this manner, in most cases, the CSV data 9 are compressed to approximately $1/1000$ to $1/1500$.

Thus, the data compression device 1 and the compression method of the present embodiment are capable of significantly reducing the required capacity of the storage device 6, storing data for a longer period of time when the storage device 6 having the same capacity is used, reducing a load on the communication network 5 and significantly reducing time required for data communication.

Figure 9:
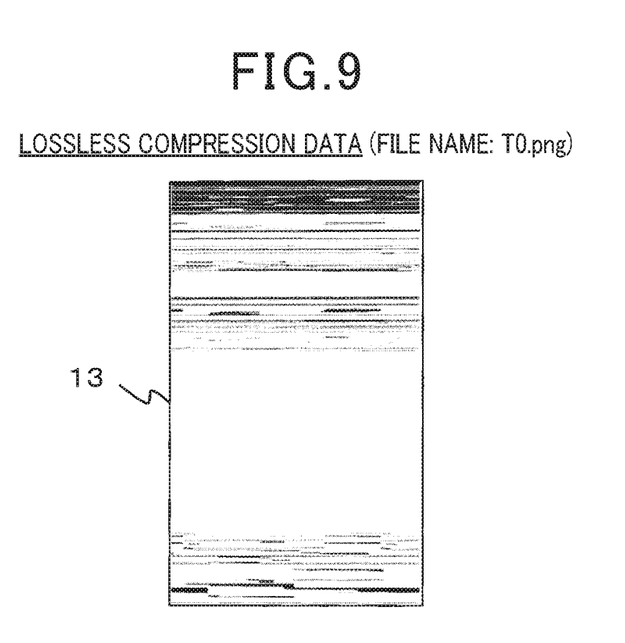
FIG. 9 visually shows an example of lossless compression data in a PNG format.

The lossless compression data 13 compressed in the PNG format by lossless compression has a data structure that matches that of an image file in the PNG format. Thus, as shown in FIG. 9, the lossless compression data 13 can be displayed, for example, by using image software. Although it is difficult to infer the original data from the image of the lossless compression data 13, for example, by comparing the lossless compression data 13 during normal operation with the lossless compression data 13 in the case of problems, it is possible to visually estimate to some extent the presence or absence of a discrepancy in control, a time of occurrence of the discrepancy, and the like.

For preservation, however, the original CSV data 9 is presumably required. Thus, the data compression device 1 or a computer placed at another facility or the like restores the original data from the lossless compression data 13 in the following manner. A method of restoring the original data from the lossless compression data 13 will be described below by taking the data compression device 1 as an example.

Figure 10:
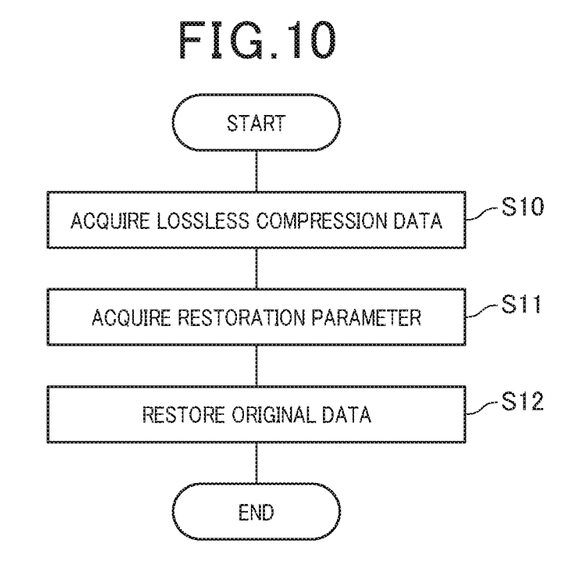
FIG. 10 shows a flow of a restoration process of restoring the CSV data from the lossless compression data.

The data compression device 1 performs a restoration process shown in FIG. 10. At step S10, the data compression device 1 acquires the lossless compression data 13, and at step S11, the data compression device 1 reads a restoration parameter. The restoration parameter includes a model of the target PLC 2 and a data format of the data transmitted from the PLC 2, and is stored in advance as information used to restore the original CSV data 9 from the lossless compression data 13 compressed by the above procedure.

The lossless compression data 13 can be treated equivalently to an image file in the PNG format. Accordingly, the data compression device 1 may be configured to record, as a restoration parameter in a header of the lossless compression data 13, a text string by which a model of the PLC 2 and a data format of the data transmitted from the PLC 2 can be identified. Thus, the original CSV data 9 can be restored from the lossless compression data 13 alone. Alternatively, for example, the data compression device 1 may be configured to attach a parameter file to the lossless compression data 13 to save the parameter file.

Subsequently, at step S12, by reversing the above-described lossless compression procedure using the acquired restoration parameter, the data compression device 1 restores the lossless compression data 13 to the original CSV data 9. Thus, the original CSV data 9 becomes usable.

In this manner, the data compression device 1 and the compression method compress data in a lossless and efficient manner and restore the original data from the compressed data.

The embodiment described above can achieve the following effects.

The data compression method of the embodiment compresses data including at least one of a character and a number, and includes the steps of: converting the data into the character string data 10 composed of 0s and 1s; treating, as 1-bit data, each of 0s and 1s included in the character string data 10 and arranging the 1-bit data in the data region 11 having a two-dimensional array; and performing lossless compression of the data arranged in the data region 11 by using the image processing method.

By converting the characters included in the original data into 0 and 1 and treating 0 and 1 as the 1-bit data in this manner, the amount of data to be compressed is reduced to ⅛ by simple calculation, as compared with a character code requiring 8-bit data. Furthermore, by reassigning the bits arranged in the data region 11 to the characters "0" and "1", the data in the data region 11 can be restored to the original data. Therefore, the data can be compressed in a lossless and efficient manner.

Furthermore, the required capacity of the storage device 6 can be significantly reduced, and when the storage device 6 having the same capacity is used, data can be stored for a longer period of time, thereby significantly reducing facility cost and running cost. Furthermore, a load on the communication network 5 can be reduced and time required for data communication can be significantly reduced, thereby reducing not only cost required for the system but also cost required for the peripheral equipment.

The step of performing lossless compression by using the image processing method is performed by using the PNG-format image processing method. The PNG-format image processing method is a well-known technique and thus a new compression algorithm is not required, thereby reducing investment. By using the PNG-format image processing method, of course, data is compressed at a high compression ratio, and thus lossless compression of the data arranged in the data region 11 can be efficiently performed. Furthermore, the PNG-format image processing method is widely used in the field of computer and has sufficient reliability.

The data to be compressed includes the comma character indicating separation, and at the step of converting the data into the character string data 10, the comma character is deleted. The comma character is inserted to separate the data, and thus approximately the same number of comma characters as the number of data are included. Accordingly, by deleting the comma characters, the number of data to be compressed can be reduced to approximately ½ by simple calculation, and thus the data can be compressed more efficiently.

The data to be compressed includes the numerical data, and at the step of converting the data into the character string data 10, the numerical data is converted into a binary number having a fixed bit width. The data transmitted from the PLC 2 may include numerical data such as a detection value of the sensor 4. The numerical data is so-called analog data, and the number of characters of the numerical data may be different in the CSV data 9.

Thus, by converting the numerical data into a binary number having a fixed bit width that covers a possible range of the numerical data, the number of characters of the character string conversion data can be standardized, thereby facilitating arrangement and restoration of the data. Furthermore, even when the number of characters, i.e., the amount of data is temporarily increased from the original data during the compression process, by assigning, to 1-bit data, "0" and "1" into which the numerical data has been converted and compressing the 1-bit data, the final amount of data can be significantly reduced.

The data to be compressed is transmitted from the PLC 2 and includes the character string ON or OFF indicating a state of the relay. At the step of converting the data into the character string data 10, the character strings ON and OFF are assigned to 1 and 0. Thus, the amount of data to be compressed can be reduced to ½ or ⅓ in advance.

The data to be compressed is transmitted from the PLC 2 and associated with a time stamp for a control cycle. The earliest time stamp associated with the data is used as a file name when the lossless compression data is saved. Accordingly, the amount of data to be compressed can be reduced by the amount of data for the time stamp, and the compression ratio can be increased.

As in the embodiment, by performing the restoration process in which the lossless compression data is restored to the original CSV data 9, the data can be used for recovery from breakdown or the like. At this time, due to the small data volume, for example, communication time can be reduced when the data is transmitted to another facility. Thus, prompt recovery from breakdown can be expected.

As in the embodiment, it is possible to save, as a single file, lossless compression data and a parameter for restoring the lossless compression data to the original data. In this manner, the original CSV data 9 can be restored from the lossless compression data alone to improve convenience, and the number of files to be stored can be reduced to facilitate management of the files.

In order to perform the data compression method described above, the data compression device 1 includes: the conversion unit is that converts data into the character string data 10 composed of 0s and 1s; the arrangement unit 1*d* that arranges the character string data 10 converted by the conversion unit 1*c* in the data region 11 having a two-dimensional array; and the compression unit 1*e* that performs lossless compression of the data arranged in the data region 11 by using the image processing method. The data compression device 1 having such a configuration can also achieve the same effects as the above-described data compression method such as data compression in a lossless and efficient manner.

Furthermore, a computer program that performs the above-described data compression method and is executed by the control unit 1*a* of the data compression device 1 can also achieve the same effects as the above-described data compression method such as data compression in a lossless and efficient manner.

The embodiment shows the configuration in which the data including a state of the relay is stored. However, the relay is rarely opened and closed at frequent intervals during a single operation cycle, and once the relay is in an open state or a closed state, the open or closed state continues for a while. Thus, storing the data including a state of the relay even though the open/closed state is not changed is presumably unnecessary. That is, the character strings "ON" and "OFF" are presumably unnecessary.

Thus, when the data to be compressed is transmitted from the PLC 2 and includes data indicating a state of the relay, by storing a timing at which the state of the relay is switched, the data can be compressed more efficiently. In this case, when the open/closed state of the relay is changed, for example, by inserting a dedicated data row in accordance with a predetermined rule, for example, 20-bit data for each time shown in FIG. 5 of the embodiment can be reduced by 4-bits to 16-bit data, and the compression ratio can be greatly improved.

The embodiment shows the example in which the individual data are sequentially arranged in the data region 11. When a single piece of character string conversion data fits in a color value of 1 pixel, however, a single piece of character string conversion data may be arranged in 1 pixel.

The embodiment shows the example in which, as shown in FIG. 8, the individual data are sequentially arranged in a row direction of the data region 11. However, the individual data may be configured to be sequentially arranged in a column direction of the data region 11.

The embodiment shows the example in which the data region 11 is prepared in advance. However, for example, the number of pixels for each column, i.e., the number of pixels in a longitudinal direction may be determined by setting in advance the number of pixels for each row, i.e., the number of pixels in a lateral direction and sequentially arranging the individual data. Of course, the number of pixels for each row may be determined by setting in advance the number of pixels for each column and sequentially arranging the individual data.

The present disclosure has been described in accordance with the embodiment, but it is understood that the present disclosure is not limited to the embodiments or structure described above. The present disclosure encompasses various modifications and variations in an equivalent range. In addition, the scope and the spirit of the present disclosure encompasses various combinations or forms and other combinations or forms including only one element, one or more elements, or one or less elements of those.

The control unit 1*a* and the method thereof described in the present disclosure may be implemented by a dedicated computer composed of a processor and memory that are programmed to implement one or more functions embodied by a computer program. Alternatively, the control unit 1*a* and the method thereof described in the present disclosure may be implemented by a dedicated computer composed of a processor composed of one or more dedicated hardware logic circuits. Alternatively, the control unit 1*a* and the method thereof described in the present disclosure may be implemented by one or more dedicated computers composed of a combination of a processor and memory that are programmed to implement one or more functions with a processor composed of one or more hardware logic circuits. Furthermore, the computer program may be stored in a computer readable non-transitory tangible storage medium as instructions executed by a computer.

What is claimed is:

1. A data compression method of compressing data including at least one character and at least one number, the data compression method comprising the steps of:
   converting the data including the at least one character and the at least one number into binary string data composed of only 1s and 1s;
   converting the binary string data into pseudo image data by dividing the binary string data into a sequence of segments each having a predefined number of bits and storing the sequence of segments in a two-dimensional array of pixels, with each pixel corresponding to a segment from the sequence of segments and having a color value based on the predefined number of bits of the corresponding segment; and
   performing lossless compression on the pseudo image data by using an image processing method.

2. The data compression method according to claim 1, wherein the image processing method is a PNG-format image processing method.

3. The data compression method according to claim 1, wherein:
   the data includes a plurality of comma characters with each comma character of the plurality of comma characters indicating separation between individual pieces of the data; and
   converting the data into the binary string data includes deleting the plurality of comma characters.

4. The data compression method according to claim 1, wherein:
   converting the data into the binary string data includes converting the at least one number into a binary number having a fixed bit width.

5. The data compression method according to claim 1, wherein:
the data is transmitted from a programmable logic controller and includes ON and OFF characters each indicating a state of a relay; and
converting the data into the binary string data includes assigning the ON and OFF characters to 1 and 0, respectively, and replacing the ON and OFF characters with 1 and 0, respectively, in the binary string data.

6. The data compression method according to claim 1, wherein:
the data is transmitted from a programmable logic controller and includes at least one time stamp for a control cycle; and
converting the data into the binary string data includes deleting the at least one time stamp.

7. The data compression method according to claim 1, wherein:
the data is transmitted from a programmable logic controller and includes data indicating a state of a relay; and
a timing at which the state of the relay is switched is stored.

8. The data compression method according to claim 1, wherein:
the data is transmitted from a programmable logic controller and includes a time stamp for a control cycle; and
when the data compressed by lossless compression is saved, an earliest time stamp is used as a file name of a file storing the compressed pseudo image data.

9. The data compression method according to claim 1, wherein the predefined number of bits is 24 bits.

10. A data compression device for compressing data including at least one character and at least one number, the data compression device comprising:
a conversion unit configured to convert the data including the at least one character and the at least one number into binary string data composed of only 0s and 1s;
an arrangement unit configured to convert the binary string data into pseudo image data by dividing the binary string data into a sequence of segments each having a predefined number of bits and storing the sequence of segments in a two-dimensional array of pixels, with each pixel corresponding to a segment from the sequence of segments and having a color value based on the predefined number of bits of the corresponding segment; and
a compression unit configured to perform lossless compression on the pseudo image data by using an image processing method.

11. The data compression device according to claim 10, wherein the image processing method is a PNG-format image processing method.

12. The data compression device according to claim 10, wherein:
the data includes a plurality of comma characters with each comma character of the plurality of comma characters indicating separation between individual pieces of the data; and
the conversion unit is configured to delete the plurality of comma characters when converting the data into the binary string data.

13. The data compression device according to claim 10, wherein:
the conversion unit is configured to convert the at least one number into a binary number having a fixed bit width.

14. The data compression device according to claim 10, wherein:
the data is transmitted from a programmable logic controller and includes ON and OFF characters each indicating a state of a relay; and
the conversion unit is configured to assign the ON and OFF characters to 1 and 0, respectively, and to replace the ON and OFF characters and to convert the data into the binary string data by replacing the ON and OFF characters with 1 and 0, respectively.

15. The data compression device according to claim 10, wherein:
the data is transmitted from a programmable logic controller and includes a time stamp for a control cycle; and
the conversion unit is configured to delete the time stamp from the data when converting the data to the binary string data.

16. The data compression device according to claim 10, wherein:
the data is transmitted from a programmable logic controller and includes data indicating a state of a relay; and
a timing at which the state of the relay is switched is stored.

17. The data compression device according to claim 9, wherein:
the data is transmitted from a programmable logic controller and includes a time stamp for a control cycle; and
when the data compressed by lossless compression is saved, an earliest time stamp is used as a file name of a file storing the compressed pseudo image data.

18. The data compression device according to claim 10, wherein the predefined number of bits is 24 bits.

* * * * *